(12) United States Patent
Choy et al.

(10) Patent No.: US 7,890,700 B2
(45) Date of Patent: Feb. 15, 2011

(54) METHOD, SYSTEM, AND COMPUTER PROGRAM PRODUCT FOR CROSS-INVALIDATION HANDLING IN A MULTI-LEVEL PRIVATE CACHE

(75) Inventors: Ka Shan Choy, Poughkeepsie, NY (US); Jennifer A. Navarro, Poughkeepsie, NY (US); Chung-Lung Kevin Shum, Wappingers Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/051,736

(22) Filed: Mar. 19, 2008

(65) Prior Publication Data

US 2009/0240889 A1    Sep. 24, 2009

(51) Int. Cl.
*G06F 12/00* (2006.01)
(52) U.S. Cl. .................. 711/124; 711/122; 711/121; 711/E12.034; 711/E12.037
(58) Field of Classification Search ................ None
See application file for complete search history.

(56) References Cited

U.S. PATENT DOCUMENTS

| | | | |
|---|---|---|---|
| 6,813,633 B2 | 11/2004 | Wong et al. | |
| 6,865,645 B1 | 3/2005 | Shum et al. | |
| 7,093,075 B2 | 8/2006 | Reohr et al. | |
| 7,366,847 B2 * | 4/2008 | Kruckemyer et al. | 711/144 |
| 2002/0083271 A1 | 6/2002 | Mounes-Toussi | |
| 2005/0071564 A1 | 3/2005 | Luick | |
| 2005/0144392 A1 | 6/2005 | Chrysos | |
| 2006/0016279 A1 | 1/2006 | Sato et al. | |
| 2006/0248287 A1 | 11/2006 | Buyuktosunoglu et al. | |
| 2007/0136535 A1 | 6/2007 | Rajamony et al. | |
| 2007/0156963 A1 | 7/2007 | Chen et al. | |
| 2008/0022049 A1 | 1/2008 | Hughes et al. | |

OTHER PUBLICATIONS z/Architecture, Principles of Operation, Sixth Edition, Apr. 2007, Publication No. SA22-7832-05, copyright IBM Corp. 1990-2007, pp. 1-1218.

* cited by examiner

*Primary Examiner*—Reginald G Bragdon
*Assistant Examiner*—Baboucarr Faal
(74) *Attorney, Agent, or Firm*—Cantor Colburn LLP; John Campbell

(57) ABSTRACT

A method, system, and computer program product for cross-invalidation handling in a multi-level private cache are provided. The system includes a processor. The processor includes a fetch address register logic in communication with a level 1 data cache, a level 1 instruction cache, a level 2 cache, and a higher level cache. The processor also includes a set of cross-invalidate snapshot counter implemented in the fetch address register. Each cross-invalidate snapshot counter tracks an amount of pending higher level cross-invalidations received before new data for the corresponding cache miss is returned from the higher-level cache. The processor also includes logic executing on the fetch address register for handling level 1 data cache misses and interfacing with the level 2 cache. In response to the new data, and upon determining that older cross-invalidations are pending, the new data is prevented from being used by the processor.

11 Claims, 3 Drawing Sheets

| CYCLE | 1 | 2 | 3 | 4 | 5 | 6 | 7 | 8 | 9 | 10 | 11 | 12 | 13 |
|---|---|---|---|---|---|---|---|---|---|---|---|---|---|
| L2 DATA WARNING (LINE Y) | X | | | | | | | | | | | | |
| L2 DATA RETURN (LINE Y) | | | | X | | | | | | | | | |
| SNAPSHOT>0 | | | X | X | X | X | X | | | | | | |
| RESTART PIPE | | X | | | | | | | | | | | |
| RECYCLE REQUEST | | | | X | | | | | X | | | | |
| REQUEST REJECTED | | | | | | X | X | | | | | | |
| XI FOR LINE Y PROCESSED | | | | | | | | | | | X | | X |

<=RESTART BASED ON DATA WARNING

<=DUE TO SNAPSHOT > 0

<=RESTART BECAUSE SNAPSHOT GOES TO ZERO

<=DUE TO LINE Y GOT XID OUT

FIG. 3

METHOD, SYSTEM, AND COMPUTER PROGRAM PRODUCT FOR CROSS-INVALIDATION HANDLING IN A MULTI-LEVEL PRIVATE CACHE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to maintaining storage coherency in a system with multi-level private caches and, more particularly, to a method, system, and computer program product for cross-invalidation handling in a multi-level private cache.

In a multiprocessing system where a strongly consistent memory image is required, as in z/Architecture™ implemented by IBM® System z processors, memory usage among different processors is managed using cache coherency ownership schemes. These schemes usually involve having an indication of which processor currently has the "exclusive" right to update a cache line. For one of such protocols, when a processor is requesting rights to update a line, it will check its local cache (L1) for the line's ownership state. If needed, it will then send an "exclusive ownership request" to the higher level cache controller which tracks which processor, if any, currently owns a line exclusively, and which processor, if any, currently owns the line read-only. The cache controller will then send a "cross invalidate" or "ownership change" request to the processor which currently owns that line exclusive to release its exclusive rights; or to the processors having read-only access to stop using that line. Once the owning processor has responded that the exclusive ownership is released, the requesting processor will then be given exclusive rights to the line. Once it has relinquished exclusive rights to a line, that processor must re-request the exclusive ownership to that same line from the higher level memory controller before it can perform any additional updates to that line. Similarly, once a "read-only" processor has received a invalidate request, it need to ensure such line's usage is still consistent with the coherency requirement.

A typical example:

Processor #1 Processor #2

(1.1) change A (2.1) inspect B (1.2) change B (2.2) inspect A

When processor#2 observed B as a new value from processor#1's store, it also has to observe A as being the new value updated by processor#1, since the store to A is logically earlier than the store to B while processed in processor #1.

This means when B's value is received in processor#2, all previously communicated XI have to be effective to prevent A's old value from being observed in processor#2.

In a system where there is a hierarchy of private caches between a level-1 cache and a storage controller, e.g., a level-2 level cache, it is desirable that XI be first looked up in the level-2 cache, and level-1 cache will only be interrupted for XI processing if that concerned line still exists in level-2 cache. Most times, the line is already replaced by another line (note that it is known to those skilled in the art that the level-2 cache will maintain a subset of level-1 cache, as will become relevant in the following discussion).

On the other hand, if the storage controller also contains, e.g., the level-3 cache, then any level-1 and level-2 misses will want any data returned to be forwarded to the level-1 cache and, thus, the processor as soon as possible, including bypassing the level-2 cache.

In a multiprocessor system with private L1/L2 and shared L3 caches where L3 is the intended cache coherency manager (storage controller), when processor P1 wants to store to line X while processor P2 already has ownership of it, a cross-invalidate (XI) is sent from the L3 cache to L2 of processor P2 to prevent it from using the potentially out-of-date data.

Due to physical latency and other aspects of the microarchitecture, the XI might not get to the L1 of the processor P2 in time to invalidate the L1 cache to maintain cache coherency. This could be because of delays in communication, or the fact that the XI is still in waiting for priority in L2. What is needed is a way to make sure processor P2 does not use the old data for line X after it has used the new data for line Y where line Y was stored to later than line X by another processor (as shown in example above). This can happen if processor P2 misses line Y and gets the miss data from the L3 cache (possibly bypassing through the L2) before the XI for line X gets processed through the L2. Since line X already resides in P2's L1 cache, it can potentially access it without knowing that it is out-of-date.

Moreover, sometimes the higher level caches are composed of a parallel pipe design in which two or more concurrently operating caches operate on various cache operations based on address bit partitions. A simple example is a 2-way parallel design in which one cache operates on odd cache lines and another operates on even cache lines. This further introduces/aggravates the "XI handling" vs. cache miss usage when XI is coming from one pipe while a cache miss is responded to from another.

SUMMARY OF THE INVENTION

A method, system, and computer program product for cross-invalidation handling in a multi-level private cache are provided. The system includes a processor. The processor includes a fetch address register logic in communication with a level 1 data cache, a level 1 instruction cache, a level 2 cache, and a higher level cache. The processor also includes at least one cross-invalidate snapshot counter implemented in the fetch address register logic. Each cross-invalidate snapshot counter tracks an amount of pending higher level cross-invalidations received before new data is returned from the higher-level cache. The fetch address register logic also provides functions for handling level 1 data cache misses and interfacing with the level 2 cache. In response to the new data received from a higher level cache, and upon determining that older cross-invalidations are pending, the new data is prevented from being used by the processor.

Method and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a timing diagram showing how a forward progress problem can occur.

The detailed description explains the preferred embodiments of the invention, together with advantages and features, by way of example with reference to the drawings.

DETAILED DESCRIPTION OF THE INVENTION

In an exemplary embodiment the Fetch Address Register logic (FAR) refers to the logic responsible for handling L1 data cache misses and the interface with L2 caches. Inside the FAR control logic, each cache misses that is outstanding uses a set of XI snapshot counter to keep track of the amount of L3 XI's that came before the new L3 data return for its miss. If there are older XI's still pending, then the new L3 data is not allowed to be used.

With this scheme, the use of the any newly returned data from the cache level at the storage controller is blocked until any older XI's are handled and accounted for. An alternate implementation can allow the usage of new data; however, possibly older data (i.e., those already existing in level-1 cache) should not be used. Only the use of new data is tracked. Thus, if the new data is unused, the problem of using the old data after the new data is prevented.

Figure 1:
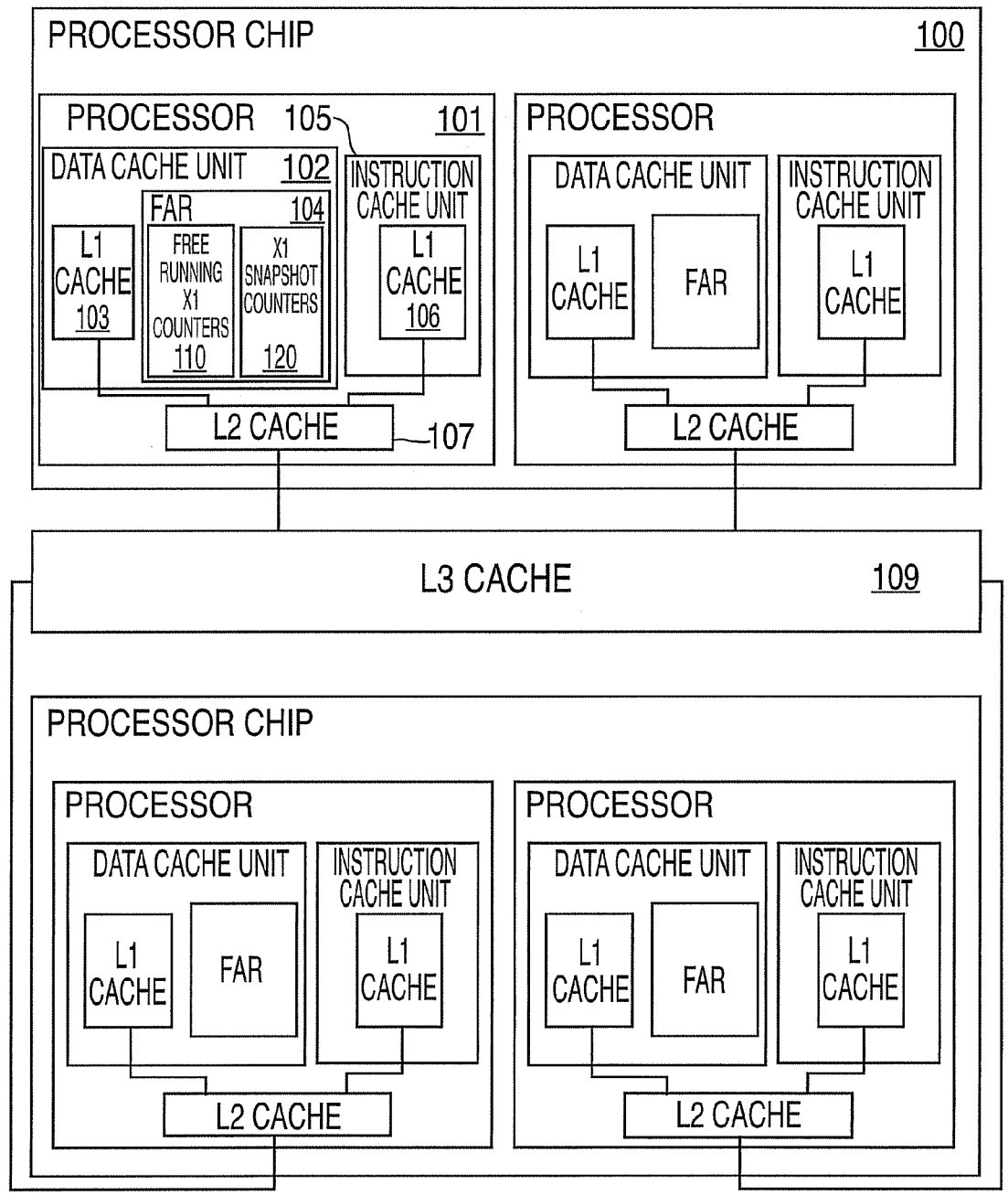
FIG. 1 illustrates one example of a multiprocessor system cache structure in an exemplary embodiment.

FIG. 1 shows a multiprocessor system with multiple processors 101 residing on a processor chip 100. Inside each processor 101, there is a data cache unit 102, an instruction cache unit 105, and a private L2 cache 107. Inside the data cache unit 102, there is a private L1 data cache 103 and the Fetch Address Register (FAR) logic 104. Inside the instruction cache unit 105, there is a private L1 instruction cache 106. There is a shared L3 cache 109 that services multiple processor chips 100. This shared L3 is the intended cache coherency manager (storage controller).

Inside the L1 data cache 103, there is a free running XI counter 110 which increments when the L2 107 has received an XI request from the L3 109 (the storage controller maintaining MP coherency) and decrements when the L2 107 has processed those XI, and has sent the XI to the L1 caches 103 106 when needed. In this design, the L2 107 will not send XI to the L1 caches 103 106 if it doesn't hit in its directory, or if it hits in its directory but knows that it is not in the L1 caches 103 106. Some implementations can have the L1 103 106 send report of its replacement line address during a cache miss, so that L2 107 can knowingly remove the L1 ownership bit of that line address in its directory. Furthermore, the L2 might have separate ownership bits, once for L1 103 and one for L1 106, indicating the line may be existing in the instruction L1 cache 103 and/or the data (operand) L1 cache 106. The filtering provided by L2 107 helps performance by eliminating unnecessary disruption having the L1 process XIs.

For each cache miss outstanding, the FAR 104 maintains a XI snapshot counter 120 and it takes a snapshot of the free running XI counter 110 when the L2 107 has received the L3 109 data response for the corresponding miss. Thus, the amount of any pending and older XIs still need to be processed can be captured per data return (i.e., possibly newly updated data by another processor).

In another embodiment where the L2 or the L3 is implemented as two parallel running slices, with one slice managing odd cache lines, and one slice managing even cache lines, 2 free running XI counters 110 will be needed. Similarly, 2 XI snapshot counters 120 will be needed per cache miss in the FAR 104. If the either of the snapshot counters 120 is non-zero, that means that there are outstanding L3 XI's that came before the L3 response. Also, it is possible due to physical reasons, such as wiring delays and asymmetry in transmission distance in a chip having more than one processor core; depending on the core position in the chip, XI from one of the two slices might be delayed more than if the XI is from the other slice. In this example, the possible delay of 3 cycles is used. Normal protocol in the system design provides that all L3 XI have to be received at or before a L3 response on a fetch. In this case, when there is a known discrepancy, the XI increments that come in within three core cycles after the snapshot will need to be accounted for.

FAR 104 logic will update a set of the sector valid bits, each set for a cache miss line, with each bit indicating whether a "chunk" or "sector" of data within a cache line has been written into its L1 cache so it knows whether subsequent access to that particular sector for that particular cache line is valid. This is necessary because data sectors being returned for a cache miss might have some latency gap in between.

In a normal processor pipeline, when the next to complete instruction encounters a cache miss, it will stall until the Data Cache Unit 102 indicates the miss is returning. The FAR 104 logic, which is inside the data cache unit 102 and is responsible for tracking cache misses, will restart the processor pipeline when one of its misses being tracked is getting a data response from the L2 107 or L3 109, regardless of the corresponding snapshot counters 120, since it will delay the restart too long if it waits for the snapshot to happen, particularly in a design where the XI can be delayed for a delayed slice. When the snapshot XI counts for a cache miss is nonzero, this indication is used to mask off the corresponding set of data sector valid bits. By doing so, the access to any new data with a non-zero snapshot can be tricked into thinking that the sector is not available, and the processor will have to be stalled again.

Figure 2:
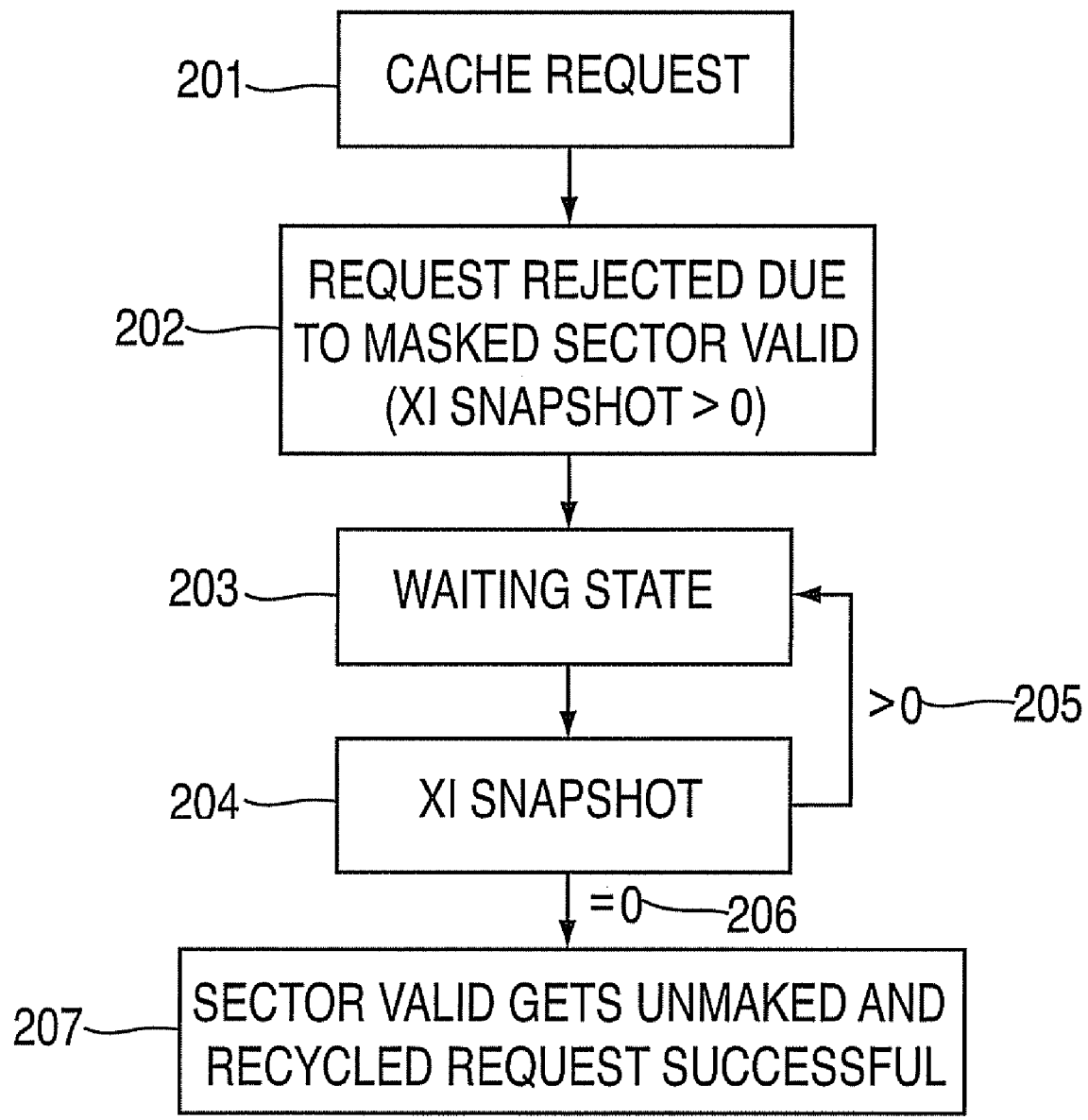
FIG. 2 illustrates a flow diagram for a XI snapshot reject scheme in an exemplary embodiment.

FIG. 2 illustrates how XI snapshot counters 120 are used to maintain storage consistency. If a cache request with address matching a pending cache miss inside FAR 104 at block 201 while its corresponding XI snapshot is non-zero, it will get rejected and will look like a data transit reject at block 202 (i.e., requested sector is not in the cache yet). A "waiting for snapshot" state in blocks 203,205 will be armed. The sector valid bits are then unmasked when the snapshot counters 120 count down to zero (arrow 206) as each pending XI get processed by the L2 107. At this time, the "waiting for snapshot" state is reset, and the FAR logic restarts the processor pipe and allows the new data to be accessed from the cache 103 in block 207.

In an architecture that allows instruction and operand (data) to share the same memory space (i.e., same cache lines), it is necessary to avoid the fact that the "new data" is brought in by instruction cache miss. Or, if there are any other operand caches other than data cache 103 that can bring in "new data" from L3 into L2, a snapshot for those misses is also needed. These counters 120 can be implemented in similar ways as described above on a per-cache miss basis. But to simplify implementation, only a single general-purpose non-DATA cache fetch mechanism is provided.

This non-L1 data cache XI snapshot counter 120 will take a snapshot when any one of the other L1 caches gets a L3 response (instruction cache, or any Coprocessor cache private to this processor). The FAR 104 will simply block the processor pipeline when this non-L1 data cache XI snapshot counter 120 is non-zero. This is to prevent the data cache from using old data when one of the other L1 caches has fetched new data into the L2, which later will then be consumed by the data cache without having ANY snapshot since such snapshot is only done on L3 returns, and these problematic cache misses will hit the L2 and thus no longer encounter a L2 cache miss. This is referred to as a "tunneling" effect of L1 caches.

Since use of the new data is blocked until all older XI's are accounted for, it is possible that forward progress may not be made. If while the processor pipeline is blocked until all XI in a snapshot is processed, an XI to the new data line may ends up getting processed and invalidated the directory entry that holds the desired line in both L1 and L2, by the time the FAR 104 can restart the processor pipeline, there will be no data available in the caches and thus encounter a cache miss again. If this happens repetitively, the processor can be in loop making no forward progress. FIG. 3 is a timing diagram that illustrates this concept. The pipe (cycle 2) is restarted based on the L2 data warning (cycle 1), but the request gets rejected (cycle 6) due to the XI snapshot being nonzero (cycle 3-7). When the snapshot goes down to 0 (cycle 8), the pipe is again restarted (cycle 9). However, due to an XI to Y that got processed (cycle 7) while waiting for the snapshot to go to zero, the request gets rejected again (cycle 13).

Additional logic is needed to detect this forward progress problem and it will temporarily allow one (and only one) piece of new data to be used before all the older XI's are processed. By allowing the consumption of one piece of data, the processor 101 can move a step forward in its instruction processing.

If the demand request still gets cache rejected after the FAR 104 restarts based on data returning, a no-forward progress counter (not shown) in the FAR 104 logic is incremented. This indicates the demand data gets invalidated by a XI before it can be used to allow processor 101 to make forward progress. When the programmable threshold (not shown) is reached for the no-forward progress counter, the FAR 104 will start blocking any prefetches in case they are contributing to the forward progress problem. Only the demand miss, i.e. cache miss for the next to complete instruction, is allowed to make a request to L2. It will do so until forward progress is made. If a demand miss occurs while in forward progress mode, the pipe is restarted so the processor 101 can consume the demand QW being returned regardless of the XI snapshot counters. Even if the XI snapshot counters are non-zero, the sector valid is not masked. The XI processing in the Data Cache Unit 102 is also stopped to ensure that the new data is used first. Once the pipeline is restarted from the demand miss (and presumably making forward progress), any subsequent (younger) cache requests are rejected until the Data Cache Unit 102 XI logic can start blocking the cache requests again and also so that the FAR 104 can start blocking the cache accesses if any corresponding XI snapshot counters are non-zero. This is to prevent younger requests from coming in and possibly using old data, since by now the new data would have already been used while the older XIs were being ignored. The no-forward progress counter will reset once it has been determined that forward progress with the demand request (i.e., no cache rejects) has been made.

This special handling of forward progress mode is done only when a no-forward progress mode is detected. This is to minimize blockage of XI handling in L1 such that possibility of XI being queued up for too long or too much can be reduced. In some system design, this could lead to unnecessary throttling or potential performance problems.

In an architecture that requires architectural serialization be observed, some of the "new" data from another processor will have to be observed after the serialization point regardless of whether "newer" data (with respect to a FAR) is used up prior thereto. In those cases, the FAR logic or some other logic responsible for decoding/detecting a serialization instruction, as defined in the instruction set architecture (ISA), will need to block all fetches until all prior XIs in L2 had been processed. This can be done by a separate serialization snapshot counter (not shown) which snapshots the number of pending XIs in L2, and blocks fetches until such counter becomes zero. In IBM®'s z/Architecture, instruction fetches will also need to be blocked in addition to operand fetches. This may require a special interface from this logic to flush all instruction fetch already buffered, and hold further instruction or operand fetches until the snapshot becomes zero. This prevents any "old" data from being used past a serialization point when the software might observe an inconsistency.

This is illustrated with an example from z/Architecture (showing the effects of serialization—location A initially contains FF hex), as provided below.

CPU 1 CPU 2
MVI A,X'00' G CLI A,X'00'
BCR 15,0 BNE G

The BCR 15,0 instruction executed by CPU 1 is a serializing instruction that ensures that the store by CPU 1 at location A is completed. However, CPU 2 may loop indefinitely, or until the next I/O or external interruption on CPU 2, because CPU 2 may already have fetched from location A for every execution of the CLI instruction. A serializing instruction must be in the CPU-2 loop to ensure that CPU 2 will again fetch from location A.

When CPU2 has a serializing instruction added, the "serialization snapshot" will activate, and guarantee that all XI pending will be processed at the end of the instruction.

As a result of the summarized invention, technically we have achieved a solution which allows the L2 to filter out the L3 XI's and which enhances performance by eliminating unnecessary disruption having the L1 process XI's, and the L3 data can then bypass the L2 and proceed directly to the L1.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor for cross-invalidation handling in a multi-level private cache, comprising:
    a fetch address register logic in communication with a level 1 data cache, a level 1 instruction cache, a level 2 cache, and a higher level cache;
    a set of cross-invalidate (XI) snapshot counters implemented in the fetch address register logic, each cross-invalidate snapshot counter tracking an amount of pending higher level cross-invalidations received before new data for a corresponding cache miss is returned from the higher-level cache; and
    logic executing on the fetch address register for handling level 1 data cache misses and interfacing with the level 2 cache;
    wherein, in response to the new data, and upon determining that older cross-invalidations are pending, preventing the new data from being used by the processor.

2. The system of claim 1, wherein the level 2 cache comprises two concurrently running sliced caches.

3. The system of claim 1, wherein the higher level cache is a storage controller.

4. The system of claim 2, wherein the higher level cache comprises two concurrently running sliced caches.

5. The system of claim 1, wherein the fetch address register logic further comprises free running cross-invalidate counters that increment on any cross-invalidate received from higher level cache, and decrement when the cross-invalidate is processed.

6. The system of claim 5, wherein each cross invalidate snapshot register is updated from the free running cross invalidate counter when data is received from the higher level cache on any level 2 cache miss.

7. The system of claim 6, wherein the processor further comprises a generic XI snapshot counter that is updated from the free running cross invalidate counter on other non-data cache misses that get new data from higher level cache.

8. The system of claim 1, wherein preventing new data being used by the processor comprises masking the sector valid bits on the corresponding cache miss line address to mimic a data transit waiting condition.

9. The system of claim 1, wherein the processor further comprises a forward progress counter that is incremented when a pipeline restart after data received from higher level cache encounters a subsequent cache miss to the same cache line.

10. The system of claim 9, wherein the processor further comprises a forward progress threshold that upon the forward progress counter reaching such threshold, the XI snapshot mechanism is disabled, and XI processing is disabled until a pipeline restart can successfully obtain the pipelines desired data.

11. The system of claim 1, wherein the processor further comprises detection of architecturally serializing instruction, upon which, the processor flushes the pipeline and any buffered fetches if the free running cross invalidate counter is non-zero.

* * * * *